July 22, 1958 P. E. CATE 2,844,320
DEVICE FOR PROPORTIONING DIFFERENT TEMPERATURE FLUIDS
Filed Sept. 2, 1955 3 Sheets-Sheet 1

INVENTOR.
PAUL E. CATE.
BY
HIS ATTORNEY.

July 22, 1958 P. E. CATE 2,844,320
DEVICE FOR PROPORTIONING DIFFERENT TEMPERATURE FLUIDS
Filed Sept. 2, 1955 3 Sheets-Sheet 2

DISCHARGE

INVENTOR.
PAUL E. CATE.
BY
*Robert J. Henderson*
HIS ATTORNEY.

July 22, 1958   P. E. CATE   2,844,320
DEVICE FOR PROPORTIONING DIFFERENT TEMPERATURE FLUIDS
Filed Sept. 2, 1955   3 Sheets-Sheet 3
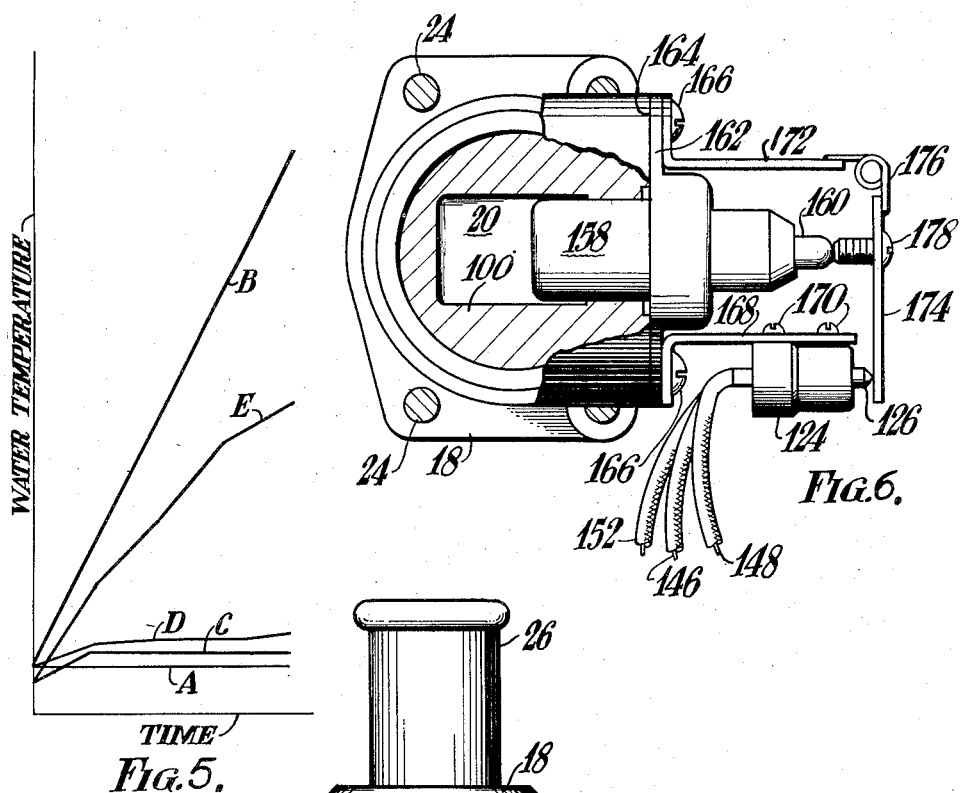
Fig.5.
Fig.6.
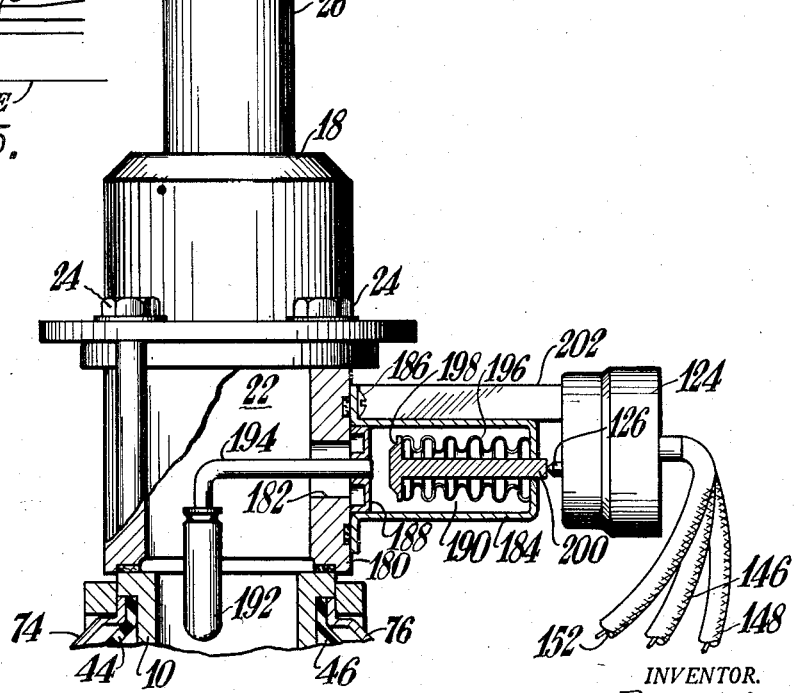
Fig.7.
INVENTOR.
PAUL E. CATE.
BY
Albert J. Henderson
HIS ATTORNEY.

United States Patent Office 2,844,320
Patented July 22, 1958

2,844,320

DEVICE FOR PROPORTIONING DIFFERENT TEMPERATURE FLUIDS

Paul E. Cate, Knoxville, Tenn., assignor to Robertshaw-Fulton Controls Company, Greensburg, Pa., a corporation of Delaware Application September 2, 1955, Serial No. 532,256

4 Claims. (Cl. 236—12)

This invention relates to apparatus for controlling the temperature of a mixture of different temperature fluids and more particularly to a device for controlling the flow of different temperature fluids to a mixing tub or the like.

This invention has particular utility when used in connection with a domestic appliance such as an automatic washing machine, it being understood, however, that the invention is not limited to this application, and therefore is to be understood that explanation of the invention by reference to its use in connection with such a domestic appliance is by way of illustration and not of limitation.

In domestic washing machines, it is desirable to obtain the optimum temperature to provide the most effective cleaning conditions and to control the shrinkage of certain materials. Since the optimum temperature generally lies between normal hot and cold water supply temperatures, it has been customary to controllably mix the hot and cold water whereby the resulting tub temperature corresponds to the optimum value.

This mixing has been accomplished in several ways; the most common of which is the use of either a thermostatic blending valve or a timer controlled valve for proportioning the hot and cold water. The customary blending type valve generally includes a casing having a mixing chamber therein and inlets for hot and cold water and an outlet for mixed or blended water. Means responsive to the temperature condition of the blended water are provided for controlling flow into the mixing chamber. While such blending valves generally effect satisfactory control of tub temperature, the cost of the same has added greatly to total cost of the appliances, such as domestic washing machines.

In the timer controlled method of mixing, a timer mechanism is utilized to control a pair of valves which control supply of hot and cold water to the tub respectively. The timing mechanism is generally operative to alternately cause flow of hot and cold water in accordance with a predetermined time program. Timer controlled devices of this type are satisfactory when the temperature of the hot and cold water are relatively constant. However, since such devices are responsive to time only, variations in either the hot or cold water temperatures result in variations of tub temperature. Thus, the timer controlled device gives only approximate control.

It is an object of this invention to control the temperature of the water in a washtub or the like by alternately delivering hot and cold water whereby the proportions of hot and cold water are a function of the temperature of the hot and cold water respectively.

Another object of this invention is to proportion the flow of hot and cold water to a washtub or the like by a single means responsive to both the hot and cold water temperatures.

In one preferred embodiment of the invention, a casing is provided with a pair of inlets which communicate with a common outlet passage. A pair of solenoid controlled valves are provided for controlling flow of water through the inlets respectively, and circuit means including a double-throw single-pole switch are provided for controlling the solenoids. The switch means have one position whereby one solenoid is energized and its respective valve means opened and another position wherein the other solenoid is energized and its respective valve means opened. Means responsive to the temperature condition of the water flowing through the outlet passage are operatively connected to the switch for actuating the same between said positions.

Other objects and advantages will become apparent from the following description taken in connection with the accompanying drawings wherein:

Fig. 5 is a temperature vs. time curve showing the operating characteristics of the invention as compared with current devices;

Fig. 6 is an enlarged section similar to Fig. 3 showing another embodiment of the device;

Fig. 7 is a front elevation partly in section showing a portion of the device and still another embodiment of the invention.

Figure 1:
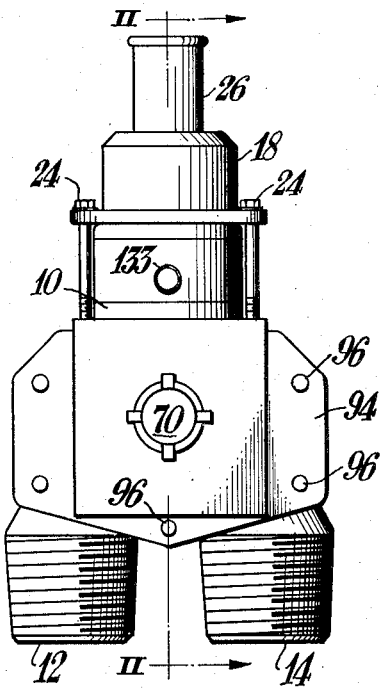
Fig. 1 is a front elevation of the fluid proportioning device embodying this invention.
Figure 2:
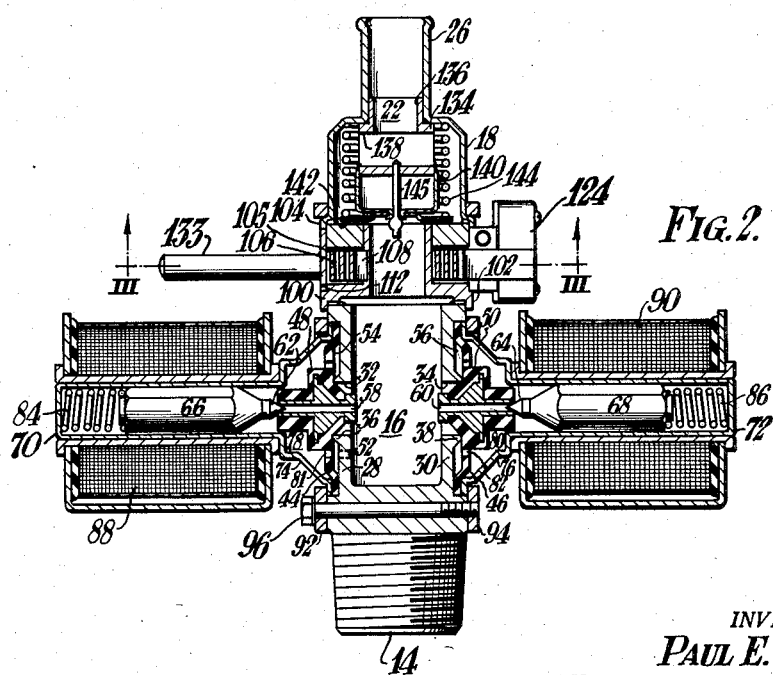
Fig. 2 is a section taken along the line II—II of Fig. 1.

Referring more particularly to Figs. 1 and 2, the temperature control device includes a main casing 10 having a pair of spaced inlet nipples 12 and 14 which may be externally threaded to receive suitable connections leading from hot and cold water lines respectively. The spaced inlets 12 and 14 communicate with the hollow interior of the casing 10 and are separated by the side walls of an axially extending central passage 16 extending through the casing 10.

An end casing 18 is attached to the end of the casing 10 opposite the inlets 12 and 14 and is also provided with an axially extending passage 22 which communicates with the passage 16 and is in axial alignment therewith. The end casing 18 may be attached to the casing 10 by any suitable means, here shown as screws 24, 24. The passage 16 is continued by a suitable tubular extension 26 of the casing 18 by means of which the passage 22 may be connected to supply water to an appliance such as a washing machine.

Valve means are provided to control the flow of hot and cold water entering the inlets 12 and 14 respectively and, to this end, the casing 10 is provided with two parallel spaced walls 28 and 30. The walls 28 and 30 are provided with passages 32 and 34 respectively which open into the central passage 16 of the casing 10 to establish communication between the outer sides of the walls 28 and 30 respectively and the passage 16. Valve seats 36 and 38 are formed on the walls 28 and 30 at the ends of the passages 32 and 34 respectively.

A pair of diaphragms 44 and 46 having integrally formed valve members 48 and 50 respectively are positioned on the walls 28 and 30 whereby the valve members 48 and 50 will be cooperable with the valve seats 36 and 38 to control the flow of water through the passages 32 and 34 respectively. The inlet 14 communicates by means of a passage 52 in the wall 28 with an annular chamber 54 defined by the diaphragm valve 44. The other inlet 12 communicates with a diaphragm chamber 56 defined by the diaphragm 46 by means of a similar passage (not shown) in the wall 30.

The diaphragms 44 and 46 and integrally formed valves 48 and 50 are pressure operated diaphragm valves of a well-known form and are provided with central apertures 58 and 60 in their respective valve members which are controlled by two pilot valves 62 and 64 respectively. The valves 62 and 64 are shown as being formed integrally with the inner ends of two plungers 66 and 68 which are slidably positioned in two tubular guides 70 and 72 respectively. The guides 70 and 72 are here shown as being formed integrally with and extending outwardly from two caps 74 and 76 respectively, which engage the outer surfaces of the respective diaphragms 44 and 46, adjacent their edges, and with the diaphragms 44 and 46 define outer chambers 78 and 80 respectively which communicate with the associated chambers 54 and 56 by means of bleed passages 81 and 82. A spring 84 is mounted in compression between the end of the plunger 66 and end of guide 70 and is operative to bias the valve 62 toward engagement with the shoulder at the end of the aperture 58. A similar spring 86 is associated with the plunger 68 and operative in the same manner with the valve 64.

The plungers 66 and 68 function as armatures for two solenoid coils or power means 88 and 90 which encircle their respective guides 70, 72 and are suitably mounted thereon. The caps 74 and 76 are shown as being maintained in fluid tight engagement with the outsides of the respective diaphragms by means of two yokes 92 and 94 engaging the edges of the caps 74 and 76 respectively, and clamped thereto by means of two screws 96 extending through the yoke 92 and threaded within the yoke 94.

The above-described solenoid valves operate in a manner well known in the art. When the valve member 48 is in the closed position as shown in Fig 2, hot water leaks through the bleed passage 81 and establishes a pressure differential on the diaphragm 44 which forces the valve member 48 into engagement with the seat 36. However, when the solenoid coil 88 is energized the plunger 66 and valve member 62 are attracted outward to open the port 58. Opening of port 58 releases the fluid pressure acting on diaphragm 44 in the chamber 78 whereupon the diaphragm 44 and valve member 48 are moved outward under the pressure force of the hot water within the chamber 54 to open the passage 32 and permit flow of hot water from the chamber 54 to the passage 16. Upon deenergization of the coil 88 plunger 66 will move toward the valve member 48 under the bias of the spring 84 until the valve member 62 engages the shoulder at the end of the passage 58 whereupon the pressure differential in the diaphragm 44 will be restored and will become operative to move the valve member 48 into engagement with the seat 36. Thus, when the coil 88 is energized, full flow of hot water into the passage 16 occurs, while in the deenergized condition of the coil 88 flow of hot water into the mixing chamber 16 is prevented.

The valve means including the diaphragm 46 and valve member 50 operate as above described for the hot water valve means. Upon energization of the coil 90 full flow of cold water into the passage 16 is permitted while in the deenergized condition of the coil 90 flow of cold fluid into the passage 16 is prevented. The device thus far described operates in a manner well known in the art and further description is deemed unnecessary.

Figure 3:
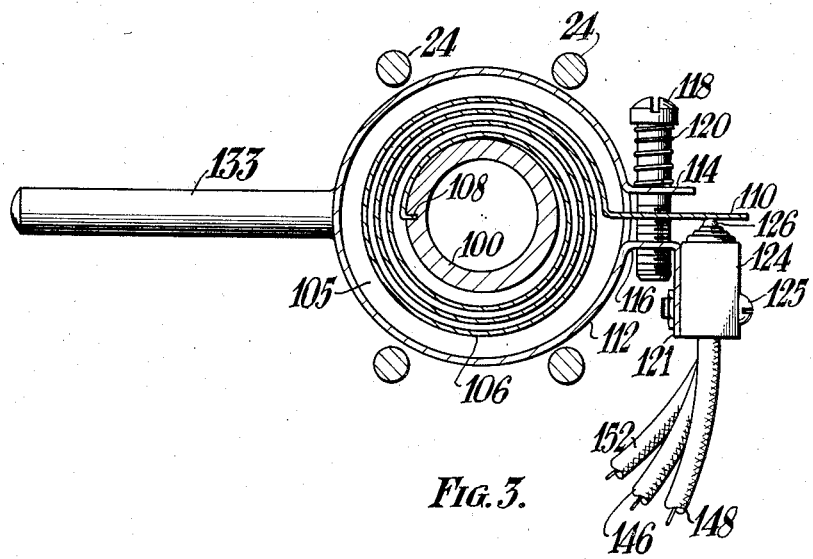
Fig. 3 is an enlarged section taken along the line III—III of Fig. 2.

When either of the coils 88, 90 are energized water will flow through the passages 16 and 22 and out the extension 26 to the washing machine. Since it is desired to control energization of the coils 88 and 90 whereby the temperature of the water in the washing machine is relatively constant, temperature responsive means are positioned to be thermally affected by the water flowing through the passages 16 and 22 and to control energization of the solenoid coils 88 and 90. Referring now more particularly to Figs. 2 and 3, a generally cylindrical supporting member 100 having a centrally disposed bore in axial alignment with the passage 16 is positioned between the casing 10 and end casing 18. The support 100 may be an integral part or constructed in sections as indicated. The lower end of support 100 is provided with an extending annular shoulder 102 which is adapted to receive the upper terminal end of the casing 10. The lower end of the end casing 18 is provided with an increased diameter portion 104 for the reception of the upper terminal end of the support 100. The support 100 is clamped in fluid tight relationship with respect to the casing 10 and end casing 18 by means of screws 24.

The cylindrical support 100 defines an annular recess 105 on its periphery intermediate the ends thereof, in which a bimetallic thermal element 106 is spirally mounted. The bimetal thermal element 106 may be formed from the customary dissimilar metals and has the inner end 108 thereof bent substantially at right angles and embedded in the wall of the recess 105. The outer end of the bimetal element 106 is also bent substantially at right angles to define an operating arm 110 which is operative to control a switching mechanism now to be described.

A flexible split ring 112 is clamped around the periphery of support 100 and substantially encloses the recess 105 and bimetal element 106. The ends of the ring 112 are outwardly bent to define two parallel arms 114, 116 which lie on opposite sides of the operating arm 110 and are parallel therewith. A screw 118 is inserted through the arm 114 and operating arm 110 and threaded in the arm 116 for tightening the ring 112. A spring 120 is mounted in compression between the arm 114 and the head of the screw 118 and operative as a yieldable connection between the screw 118 and arm 114. Adjustment of screw 118 serves to vary the clamping pressure of the ring 112 on the support 100 and since clamping devices of this type are well known in the art further description is deemed unnecessary.

Figure 4:
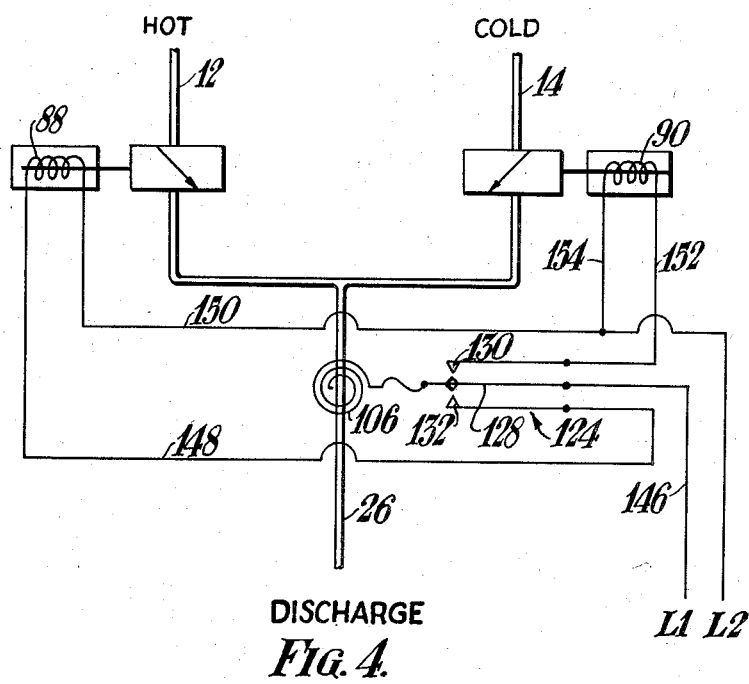
Fig. 4 is a schematic view of the proportioning device incorporating a circuit diagram.

The outer end of the arm 116 is bent to define a portion 121 generally perpendicular to the arm 114 on which is mounted a switch mechanism 124 by screws 125. The switch 124 may be of any suitable double-throw single-pole type and is shown in Fig. 3 as taking the form of a microswitch. The switch 124 is provided with the usual outwardly biased plunger 126 and, as shown schematically in Fig. 4, is provided with a switch arm 128 which is operated by the plunger 126 and positioned between a pair of fixed contacts 130 and 132. The switch arm 128 and contacts 130 and 132 are connected in an electric circuit later to be described for controlling energization of the solenoid coils 88 and 90.

The bimetal element 106 operates in a manner well-known in the art. Upon heating thereof, the element 106 will tend to unwind and the operating arm 110 will flex toward the clamp arm 114. Upon cooling of the element 106, the arm 110 will flex toward the clamp 116. The switch 124 is preferably positioned whereby the operating arm 110 will effect movement of the switch arm 128 between the contacts 130 and 132 by means of plunger 126 at a predetermined temperature intermediate the temperature of hot water in the inlet 12 and the cold water in the inlet 14.

The ring 112 may be provided with a handle 133 by means of which the temperature at which the switch arm 128 is actuated between said positions is varied. Rotation of the handle 133 varies the position of the ring 112 and switch 124 relative to the operating arm 116 thereby varying the temperature at which the switch arm 128 is actuated.

In order that the flow of water from the outlet 26 shall be constant, a constant flow valve is positioned in the passage 22 between the fitting 26 and support 100. The constant flow valve may be of any suitable type and is here shown in Fig. 2 as comprising an axially bored stud 134 provided with a reduced diameter portion 136 which is fixed within the fitting 26. The stud 134 is also provided with a passage 138 by means of which fluid may flow into the hollow interior of the stud 34 and out the fitting 26. A tubular member 140 is mounted for reciprocation on the stud 134 and when in an upper position is operative to reduce the area of the passage 138. A disc 142 is fixed at the lower end of the tubular member 140 by any suitable means and seats a spring 144 mounted in compression between the disc 142 and end casing 18. A pin 145 has one end fixed within the stud 134 and the other end thereof extending through the disc 142 to provide an abutment which limits downward movement of the disc 142 and member 140.

The above described pressure responsive device operates in a manner well known in the art. Fluid flowing in the passages 16 and 22 exerts its pressure on the lower side of the disc 142 tending to move the disc 142 upward against the bias of the spring 144. Accordingly, the pressure of fluid in passage 22 positions the tubular member 140 and controls flow through the passage 138. Since such pressure responsive devices are well known in the art further description is deemed unnecessary.

Operation

Referring to the schematic showing of Fig. 4, the switch arm 128 may be connected by lead wire 146 to a line wire L1. The contact 132 may be connected by lead wire 148 to one side of the solenoid coil 88, and the other side of the solenoid coil 88 is connected by lead wire 150 to the other line wire L2. The contact 130 is connected by lead wire 152 to one side of the solenoid coil 90 and the other side of the solenoid coil 90 connected by the lead wire 154 to the lead wire 150.

The inlets 12 and 14 may be connected by suitable fittings or conduits to a source of hot and cold water respectively and the outlet 26 may be connected to supply water to the mixing tub of a washing machine or the like. If the temperature of the bimetal element 106 corresponds to the temperature of the cold water in inlet 14, the bimetal element 106 will be in its contracted condition wherein the switch arm 128 engages the contact 132. In this position of the switch arm 128, the solenoid coil 88 is energized by means of the above traced circuit and hot water will flow from the inlet 12 to the outlet 26. Hot water thus flowing through the passages 16, 20 is operative to heat the bimetal element 106 and causes expansion of the same and movement of the arm 110 toward the arm 114. At the hereinbefore described predetermined temperature of the bimetal element 106, the arm 110 allows switch arm 128 to move out of engagement with contact 132 and into engagement with contact 130 thereby deenergizing solenoid coil 88 and energizing solenoid coil 90.

Cold water now flows through the passages 16 and 20 and out the outlet 26. The bimetal element 106 is now cooled and contracted at a predetermined rate which is a function of the cold water temperature until the arm 110 is moved sufficiently to actuate the switch arm 128 out of engagement with the contact 130 and into engagement with the contact 132 whereupon coil 90 is deenergized and coil 88 is energized to again supply hot water to the outlet 26.

The device operates continuously in the above described manner, alternately supplying hot and cold water to the washtub, the time that each valve is open being a function of the hot and cold water temperatures. Thus, the device accomplishes the objects of the invention and accordingly is capable of new and novel functions.

By turning handle 133 the relative position of the switch 124 with respect to the end of the bimetal coil 106 may be changed so as to secure different temperature settings at which the solenoids 88 and 90 are energized, thus providing for various tub water temperatures as may be desired.

A valve of the type herein described has been constructed and compared by testing with a conventional blending valve and a time controlled valve. Fig. 7 depicts a temperature vs. time curve of the resultant tub temperatures obtained through use of said current devices and a valve embodying this invention. The curve marked A indicates the cold water temperature which was constant at 100° F. and curve marked B indicates the hot water temperature which was increased from 100° F. to 180° F. over the 15-minute interval of the test. The curve marked C indicates the resultant tub temperature obtained by the use of the control device embodying this invention and curves marked E and D indicate the resultant tub temperature obtained by the timer controlled and blending valve respectively, all of said valves being set to the same delivery temperature. The results thus plotted show that the resultant tub temperature obtained by the timer controlled valve increased substantially with increase in hot water temperature, while the resultant tub temperature obtained by the invention remained fairly constant with increased hot water temperature and varied less than that obtained by the blending valve.

Another embodiment of the temperature responsive means with which the device may be provided is shown in Fig. 6. This means takes the form of a wax fusion type thermostat of conventional form comprising a relatively fixed casing 158, a movable member 160 and an expansible fusible material (not shown) disposed within the casing 158 and in communication with the movable member 160. Any suitable fusible material which will give a large volumetric change on passing from the solid to the liquid state at a predetermined temperature may be used, and since such devices are well known in the art, further description is deemed unnecessary.

In this embodiment, the support 100 is provided with a bore through the periphery thereof in which the casing 158 is fixed whereby the end thereof is in contact with fluid passing through the passage 20 which in this case has a generally non-circular axial bore. The casing 158 is provided with a flanged portion 162 which is secured to a flat surface 164, now defined by the support 100, by screws 166, 166. A generally L-shaped bracket 168 is fixed at one leg thereof to the flange 162 by means of one screw 166 and has the microswitch 124 attached to the other leg thereof by means of two screws 170, 170.

A second L-shaped bracket 172 is positioned on the opposite side of the thermostat from the bracket 168 and has one leg fixed to the flange 162 by means of the other screw 166 and the other leg thereof extending parallel to the extending leg of the bracket 168. An operating lever 174 overlies the movable member 160 and plunger 126 of the switch 124 and has one end pivotally connected to the extending leg of the bracket 172 by means of a spring 176 which is operative to bias the operating lever 174 in a clockwise direction whereby the free end thereof is engaged by the plunger 174. A screw 178 is threaded through the lever 126 intermediate the ends thereof and has one end thereof engaging the movable member 160 under the bias of the spring 176.

The switch 124 and operating lever 174 are preferably positioned whereby when the fusible material passes from a solid to a liquid state upon heating, the operating lever 174 will be rotated counterclockwise sufficiently by movement of the member 160 to position plunger 126 whereby switch arm 128 is moved out of engagement with contact 132 and into engagement with contact 130. Upon change from the liquid to the solid state of the fusible material, the reverse of the aforesaid movements will occur.

The operation of the embodiment shown in Fig. 6 is substantially the same as described from the embodiment of Figs. 1–3. If the fusible material is in a solid state the switch arm 128 will be in engagement with the contact 132, energizing solenoid coil 88 and allowing hot water to flow through the passage 22. Upon sufficient heating of the fusible material, change of state of the same will occur and operating lever 174 will be rotated sufficiently to effect movement of the switch arm 128 out of engagement with the contact 132 and into engagement with contact 130, thereby deenergizing solenoid coil 88 and energizing solenoid coil 90 causing cold water to flow through the passage 20.

Still another embodiment of the temperature responsive means is shown in Fig. 7. This means takes the form of a hydraulic actuating means and to this end the support 100 is provided with a flat exterior surface 180 having a centrally disposed bore 182 opening into the passage 22. A hollow tubular support 184 is positioned in axial alignment with the bore 182 and provided with a flanged end which is attached to the surface 180 by means of screws 186. A circular sealing disc 188 is fixed within the open end of the tubular member 184 and operative to seal the interior thereof from the passage 20, thereby defining a sealed chamber 190 within the member 184.

A temperature sensing bulb 192 is positioned within the passage 22 and connected to the disc 188 by means of a capillary tube 194 which has one end fixed to one end of the bulb 192 and the other end thereof extending through the bore 182 and fixed within a suitably centrally disposed bore of the disc 188. A flexible bellows member 196 is positioned within the member 184 and has one end thereof sealed to the end wall of the member 184 and the other end thereof movable and sealed to a disc 198 carried on the end thereof. The disc 198 is provided with an integral actuating stem 200 which extends through the interior of the bellows member 196 in axial alignment therewith to be slidably positioned in a centrally disposed bore in the end wall of the member 184.

The bulb 192, capillary tube 194, and chamber 190 define a closed system filled with a temperature responsive fluid which undergoes volumetric changes in response to temperature variations. The bellows 196 is responsive to said temperature variations and expanded or contracted by the resulting pressure variations of the fluid within the chamber 190. The stem 200 being fixed to the movable end of the bellows 180 is movable axially upon expansion or contraction of the bellows member 180. The switch 124 is positioned whereby the plunger 126 will be actuated by the stem 200 and to this end is supported by a bracket 202 whereby the stem 200 and plunger 126 are axially aligned and in engagement.

Upon heating of the bulb 192, the liquid filling its associated system will expand causing expansion of the bellows 196 and outward movement of the stem 200. The switch 124 is preferably positioned whereby stem 200 will move the plunger 126 sufficiently to move the switch arm 128 out of engagement with the contact 132 and into engagement with contact 130 at a predetermined temperature of the bulb 192 which is preferably intermediate the temperature of the hot and cold water in inlets 12 and 14 respectively. The embodiment of Fig. 7 thus operates in a manner similar to that of the embodiment shown in Figs. 1 through 3 and further description is deemed unnecessary.

While several embodiments of the invention have been herein shown and described, it will be apparent to those skilled in the art that the construction and arrangement of parts may be variously embodied or changed without departing from the scope of the invention as defined in the appended claims.

It is claimed and desired to secure by Letters Patent:

1. A device for proportioning different temperature fluids comprising a valve body having a pair of inlet passages for different temperature fluids, a pair of valve means in said body for controlling said passages respectively, electrically operable means for operating said valve means, a substantially cylindrical hollow projection on said body communicating with said inlet passages and forming an outlet therefor, a substantially cylindrical bimetal element extending around said projection and subject to the temperature of the fluid in said outlet, said element having a relatively stationary end and a free end movable in response to temperature variations in the outlet fluid, switch means operably associated with said free end for operation thereby, and circuit connections between said switch means and said electrically operable means effective for causing alternative operation of said valve means for proportioning the flow of fluids from said inlet passages to said outlet.

2. A device for proportioning different temperature fluids comprising a valve body having a pair of inlet passages for different temperature fluids, a pair of valve means in said body for controlling said passages respectively, electrically operable means for operating said valve means, a substantially cylindrical hollow projection on said body communicating with said inlet passages and forming an outlet therefor, a spiral bimetal element extending substantially coaxially around said projection and being subject to the temperature of the fluid in said outlet, said element having a relatively stationary end and a free end movable in response to temperature variations in the outlet fluid, a tubular adjustment member mounted on said projection and extending substantially coaxially around said bimetal element, switch means carried by said adjustment member for movement thereby into operative engagement with said free end, and circuit connections between said switch means and said electrically operable means effective for causing alternative operation of said valve means for proportioning the flow of fluids from said inlet passages to said outlet.

3. A device as claimed in claim 2 wherein said tubular member comprises a split ring having oppositely disposed flanged ends, said free end projecting between said flanged ends and said switch means being mounted on one of said flanged ends, and manually operable means carried by said adjustment member for positioning said switch means relative to said free end.

4. A device for proportioning different temperature fluids comprising a valve body having a pair of juxtaposed inlet passages for different temperature fluids, a pair of oppositely disposed valve seats in said body having openings communicating with said inlet passages respectively, a pair of valve members cooperable with said valve seats respectively for controlling flow of fluid through said openings, a pair of electromagnets mounted on said body for operating said valve members respectively, a substantially cylindrical hollow projection on said body opposite said inlet passages and communicating with said openings to form a single outlet therefor, a substantially cylindrical bimetal element extending around said projection and subject to the temperature of the fluid in said outlet, said element having a relatively stationary end and a free end movable in response to temperature variations in the outlet fluid, switch means operably associated with said free end for operation thereby, and circuit connections between said switch means and said electrically operable means effective for causing alternative operation of said valve members for proportioning the flow of fluids from said inlet passages to said outlet.

References Cited in the file of this patent

UNITED STATES PATENTS

| 1,585,451 | White | May 18, 1926 |
| 1,704,943 | Irving | Mar. 12, 1929 |
| 2,087,024 | Dezotell | July 13, 1937 |
| 2,146,930 | Bassett | Feb. 14, 1939 |
| 2,280,667 | Scott et al. | Apr. 21, 1942 |
| 2,354,364 | Chapman | July 25, 1944 |
| 2,395,007 | Leupold | Feb. 19, 1946 |
| 2,712,324 | Lund | July 5, 1955 |